United States Patent [19]
Fugmann

[11] Patent Number: 5,909,939
[45] Date of Patent: Jun. 8, 1999

[54] HIGH ACCURACY COORDINATE MEASURING MACHINE HAVING A PLURALITY OF LENGTH-ADJUSTABLE LEGS

[75] Inventor: Winfried Fugmann, Wetzlar, Germany

[73] Assignee: Leitz-Brown & Sharpe Messtechnik GmbH, Wetzlar, Germany

[21] Appl. No.: 08/714,372

[22] Filed: Sep. 16, 1996

[30] Foreign Application Priority Data

Sep. 18, 1995 [DE] Germany ............................ 195 34 535

[51] Int. Cl.⁶ ........................................................ G01B 5/00
[52] U.S. Cl. .................................. 33/503; 33/556; 33/559
[58] Field of Search ........................ 33/503, 1 M, 1 PT, 33/556, 558, 559, 561

[56] References Cited

U.S. PATENT DOCUMENTS

| | | | |
|---|---|---|---|
| 4,691,446 | 9/1987 | Pitches et al. | 33/1 MP |
| 4,819,339 | 4/1989 | Kunzmann et al. | 33/503 |
| 4,961,267 | 10/1990 | Herzog | 33/503 |
| 5,050,112 | 9/1991 | Hedglen et al. | 364/560 |
| 5,179,786 | 1/1993 | Shelton | 33/503 |
| 5,402,582 | 4/1995 | Raab | 33/503 |
| 5,412,880 | 5/1995 | Raab | 33/503 |
| 5,428,446 | 6/1995 | Ziegert et al. | 356/358 |

FOREIGN PATENT DOCUMENTS

| | | | |
|---|---|---|---|
| 0 109 201 | 5/1984 | European Pat. Off. | |
| 0 573 950 | 12/1993 | European Pat. Off. | |
| 2547916 | 12/1984 | France | 33/503 |
| 141 061 | 4/1980 | German Dem. Rep. | |
| 35 04 464 | 4/1986 | Germany | |
| 4218984 | 12/1993 | Germany | |
| 44 03 901 | 8/1994 | Germany | |
| 1040318 | 9/1983 | U.S.S.R. | 33/503 |
| 1548652 | 3/1990 | U.S.S.R. | 33/809 |
| 1583726 | 8/1990 | U.S.S.R. | 33/503 |
| WO 95/20747 | 8/1995 | WIPO | |

OTHER PUBLICATIONS

Spektrum der Wissenschaft [Science Spectrum], May 1991, pp. 18–22.

Schweizer Maschinemarkt [Swiss Machine Market], No. 17, 1995, pp. 26–29.

*Primary Examiner*—Christopher W. Fulton
*Attorney, Agent, or Firm*—Foley & Lardner

[57] ABSTRACT

A coordinate measuring machine includes a stationary baseplate, a workpiece receptacle, a tracing head movable relative to the baseplate, and a supply, control and evaluation device. The baseplate has legs which are mounted pivotably on at least three fixed locations on the baseplate and on a body which carries the tracing head. The length or the inclinations of the legs can be adjusted in an accurately measurable manner.

42 Claims, 7 Drawing Sheets

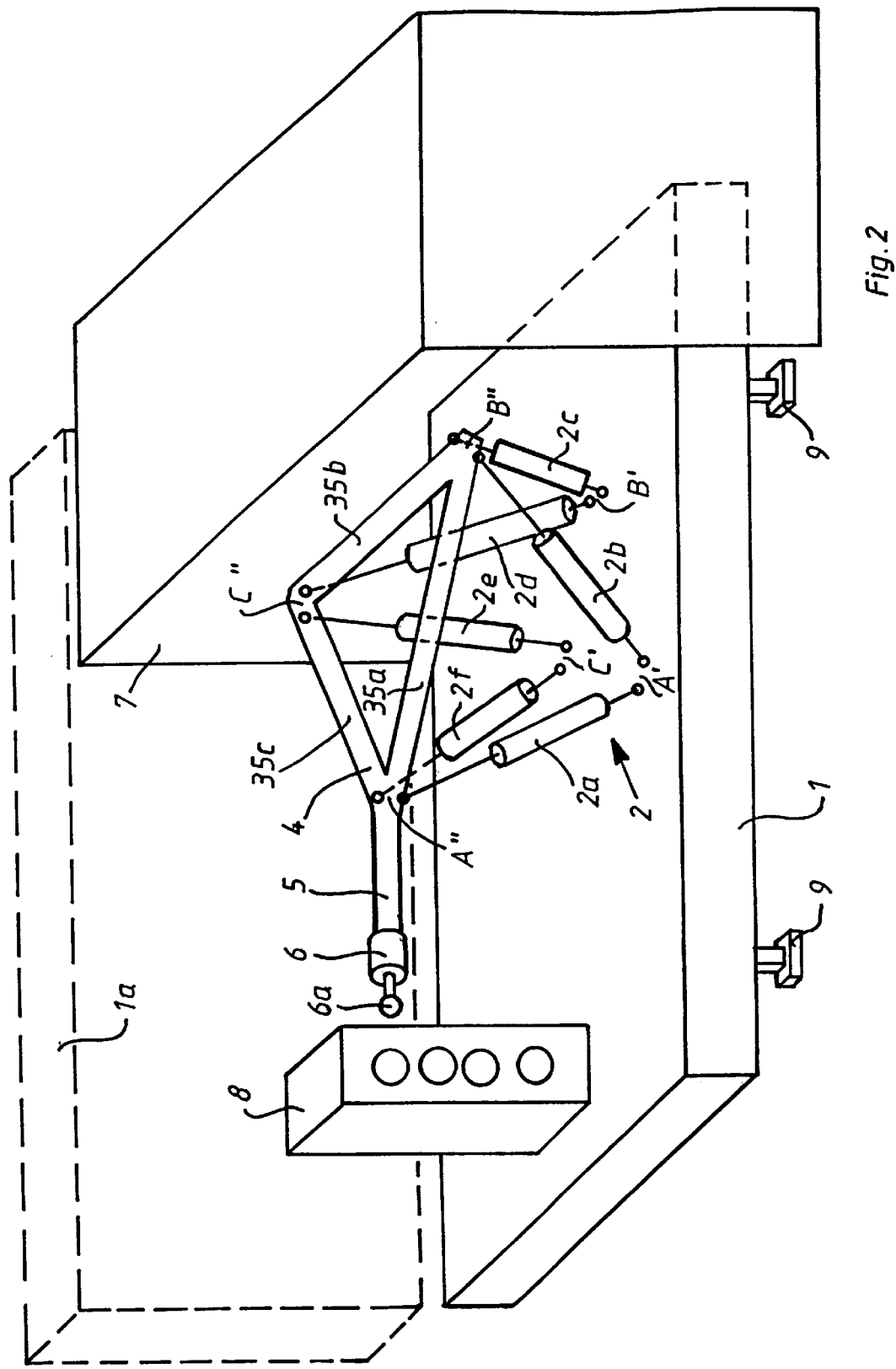

HIGH ACCURACY COORDINATE MEASURING MACHINE HAVING A PLURALITY OF LENGTH-ADJUSTABLE LEGS

BACKGROUND OF THE INVENTION

1. Field of the Invention

The invention relates generally to a coordinate measuring machine and more particularly to a high accuracy, lightweight, and inexpensive coordinate measuring machine having a plurality of length-adjustable legs for tracing an object.

2. Description of the Related Art

To trace a measuring point in a cartesian coordinate system, for example, on a workpiece, 3-D coordinate measuring machines which typically consist of a stand, a tracing system, preferably a separate supply and control unit, and an evaluation computer, are used. The function of the stand is to move the tracing system relative to the workpiece in a measurable manner. According to the prior art, this function is performed by means of three linear axes each of which are perpendicular to one another. In the case of coordinate measuring machines with a movable measuring table, two of the three linear axes supplement one another in terms of measurement and design. In the case of coordinate measuring machines with a stationary measuring table, the three linear axes supplement one another in terms of measurement and design. Alternatively, as described in German Offenlegungsschrift 44 03 901 A1, the workpiece can be traced by means of an appliance which is derived from an articulated arm robot.

The conventional means of moving the 3-D coordinate measuring machine of the three linear axes type are complicated. This is because, to displace the tracing head in a coordinate direction, each axis contains a drive, a scale system, and a guide. The function of the guide is to prevent deviations in straightness and rotation during the displacement of the tracer. An additional function of the guide is to make the deviations reproducible and therefore capable of being corrected in a machine-related manner, specifically with very high accuracy and under all permissible temperature and load conditions. For example, in a coordinate measuring machine of the gantry type having a measuring length of one meter in all three axes, the rotational guide accuracy of each axis must be well below 0.5 seconds, so that a measuring accuracy in the range of 2 $\mu$m can be achieved. Because of these requirements, most of the production costs for an axis of the coordinate measuring machine are incurred in the guide and not in the drive or the scale system.

With the measuring means available in the conventional coordinate measuring machines, it is possible to record rotational errors to an accuracy of about 0.3 seconds. On the other hand, position errors can be measured to an accuracy of about 0.5 $\mu$m. In a coordinate measuring machine with a large measuring volume, therefore, the geometrical accuracy which can be achieved is often limited by the accuracy in recording the rotational deviations.

In conventional coordinate measuring machines having a stationary measuring table, all three axes, i.e., the X-, Y- and Z-axes, supplement one another during the displacement of the tracing head. In other words, all the elements of the third axis (Z-axis) must be moved along with the second axis (Y-axis) and all the elements of the second axis (Y-axis) and of the third axis (Z-axis) must be moved along with the first axis (X-axis). In measuring machines with a movable measuring table, only two axes, namely the Y- and Z-axes, supplement one another, but the workpiece has to be moved additionally in the X-axis by means of the table carrying the workpiece. In both instances, large masses have to be moved to displace the tracing head in the cartesian coordinate directions. This makes the coordinate measuring machines of conventional design expensive and slow.

However, the three linear axes of the conventional coordinate measuring machine make it possible to achieve a displacement of the tracing head parallel to itself by means of a relatively simple control. If the tracing head is to be rotated, however, such as during optical tracing or also in the case of specific mechanical measuring tasks, it is necessary to have a turn-and-pivot device which contributes to additional inaccuracies, costs and control outlay, even when only a small pivoting range is required. Further, each linear axis of the conventional coordinate measuring machine necessitates a careful parallel adjustment of the guide, drive and scale as well as auxiliary structures, for example, structure for protection of the guide surfaces against soiling, low-friction hose, and cable guides.

The articulated arm measuring machines according to German Offenlegungsschrift 44 03 901 A1 have no linear axes and therefore avoid some of the above-mentioned costs and control outlay associated with the conventional coordinate measuring system. However, in this type too, all the axes supplement one another, thus leading to relatively large masses to be moved, particularly when a complicated tracing head is employed. Warping of the arms caused by thermal influences or by alternating loads has an effect on the measuring accuracy. The resolution of available rotary encoders is not sufficient for an accuracy in the $\mu$m range. Consequently, in terms of their performance, coordinate measuring machines of the articulated arm type are still far removed from the coordinate measuring machines of the conventional type previously described.

Coordinate measuring machines have to be checked regularly in order to prove that the specified accuracy is being adhered to. Calibrated test bodies, for example, gage blocks or ball plates, can be used for this purpose. It is also possible, however, to check the position of the tracing head by means of an independent measuring system.

To have the correctness of the coordinates of the traced measuring point confirmed, it is known from DD 141 061 to displace the tracing head according to the coordinates in a known way, but to provide, in addition to the tracing head, for checking purposes, rods which can be tilted about fixed points and the free ends of which are rotatably connected to the tracing head on all sides, and to design the rods in such a way that their length can be adjusted in a measurable manner. When the tracing head is displaced mechanically according to predetermined cartesian coordinates, it is possible, by measuring the lengths of the extendable rods of the checking system, to test whether there are measurement and/or displacement errors. Based on the changes in length of the rods, the position of the traced measuring point is calculated a second time and the set value and the measured value are compared with one another. In this design, it can only be presumed which of the two values is the correct value or an average value can be formed from the two values. This design is highly complicated, since it necessitates two measuring systems, the first to be used as the coordinate measuring machine and the second to be used as a checking system. In DE-C1 35 04 464, for example, a corresponding checking method is carried out to determine the positioning accuracy of a toolholder for a tool which is moved by a robot. This checking appliance is designed as a transportable appliance.

The technical problem on which the invention is based is to specify a coordinate measuring machine, which can be produced simply and inexpensively in terms of its basic design, in which the desired measuring accuracy and measuring speed are guaranteed, and with which measuring points which are difficult to reach can be traced easily.

SUMMARY OF THE INVENTION

An object of the invention is to provide a coordinate measuring machine which is simple, lightweight, and inexpensive in construction.

Another object of the invention is to provide a coordinate measuring machine which can accurately trace difficult measuring points.

Still another object of the invention is to provide a coordinate measuring machine which is resistant to soiling and thermal disturbances.

Still another object of the invention is to provide a coordinate measuring machine having a workpiece receptacle which is easily exchangeable.

The above and other objects of the invention are accomplished with a coordinate measuring machine which includes a stationary baseplate, a workpiece receptacle, a tracing head movable relative to the baseplate, and a supply, control and evaluation device. The baseplate has legs which are mounted pivotably on at least three fixed locations on the baseplate and on a body which carries the tracing head on a boom. The lengths or the inclinations of the legs can be adjusted in a measurable manner.

The invention employs the principle of checking measurement for carrying and moving the tracing head in an accurately measurable manner. The invention dispenses completely with the conventional coordinate measuring machines which are complicated for the reasons previously mentioned. In particular, the invention does not need the massive construction of the conventional coordinate measuring machines to displace exactly the tracing head which is relatively lightweight.

According to the invention, the tracing head is carried by a body which is designed as a relatively lightweight framework. Preferably, at least one point of the body is connected in an articulated manner to the workpiece-carrying baseplate at predetermined fixed points by means of legs of adjustable length and/or adjustable angles. The tracing head carried by the body can be moved to any desired location in the measuring range of the coordinate measuring machine solely by varying either the lengths or the angles of the legs. From the measured lengths/angles of the legs, a computer can easily determine the position of the tracing tip of the tracing head and indicate it in cartesian coordinates.

A rigid body in space has six degrees of freedom, namely three translational and three rotational degrees of freedom. In order to define the position of the tracing head unequivocally, six restricting conditions are therefore necessary. Six legs need to be provided, although not all of these have to be adjustable in length. However, at least three of the legs must be articulated and adjustable in length. The legs do not need to have the same length in the initial state. It would be advantageous, however, if the legs are of the same design, so that they can be manufactured by mass production.

Regular hexapod designs which have six legs as a means for positioning are also known in principle from the publications in the journal *Spektrum der Wissenschaft* [*Science Spectrum*], May 1991, pp. 18–22, and from the journal *Schweizer Maschinenmarkt* [*Swiss Machine Market*], No. 17, 1995, pp. 26–29. In bodies of this kind, built lightweight on a baseplate and with a rigid housing structure, it is assumed that a triangle and the bodies based on the triangle, for example, tetrahedra, octahedra, and icosahedra, have the greatest rigidity when they are loaded at the corners only. Accordingly, the hexapod design provided in the journal *Spektrum der Wissenschaft* [*Science Spectrum*] has six regularly arranged legs which serve for carrying the main mirror of a reflecting telescope for astronomical purposes and for tracking the Earth's rotation. This planned mirror is to have a diameter of at least 12 m and therefore has a very heavy weight. The hexapod design provided for mounting it is consequently aimed purely and simply at carrying and tracking a heavyweight object. The same applies to the technique, sought after in machine building, of providing a hexapod design for a machine tool. Here too, the hexapod design permits exertion of high forces.

The six legs are arranged in a hexapod design but, according to the invention, the legs carry only a relatively lightweight framework which in turn carries the tracing head. During the adjustment of the tracing head and of the tracer connected to the latter, it is therefore important only to move the tracer of the tracing head in a simple manner such that it is moved to the measuring point of the workpiece at $\mu$m accuracy. It is also preferable to arrange the tracing head on a boom of the body movable by means of the rod structure.

Typical workpieces of a coordinate measuring machine are often approximately parallelepipedic having special structures, for example, bores, the geometrical features of which are to be determined by the machine, being incorporated on a plurality of the six sides of the workpieces. In this case, it is desirable to use tracers which are as short as possible, since long tracing pin combinations are clumsy, cannot be used in many tracing heads on account of the weight, and lead to losses of accuracy and restrictions in the speed of movement.

Consequently, in coordinate measuring machines of the cartesian type, the "uppermost" of the axes in the kinematic chain is designed as a displaceable boom which has a rule with guide elements moved along with it (center sleeve). This boom, including supplementary additional structures, for example, guide, scale or collision protection, must have as small a cross section as possible, since this is included in the tracer length when features on the side faces of the parallelepipedic workpiece are being traced. Moreover, with this design, there is often the problem that, as a consequence of construction, the scale has to be attached to the center sleeve, for reasons of space for example, but when the center sleeve is in the extended position, the scale is uncovered and is exposed to dirt and thermal disturbances in an unprotected manner.

In the coordinate measuring machine according to the invention, the tracing head is not mounted directly on the framework carried by the legs. Instead, it is mounted on an end of a boom rigidly connected to the framework. In contrast to the conventional type, this boom has no guide function and can therefore be designed with a cross section which is optimized for the possibility of using short tracers and which, if appropriate, narrows. In the type according to the invention, the boom also carries no scale or other sensitive parts which have to be protected against soiling. The boom is also preferably insensitive to thermal disturbances.

A further advantage of the design according to the invention is that the baseplate, the legs, and the body carrying the tracing head can be arranged in a housing, from which the boom carrying the measuring head projects. This ensures that the elements (legs) for triggering and recording the movement and their bearings are largely shielded against soiling and external thermal influences.

A further advantage of the design according to the invention is that the receptacle for the workpiece to be measured can be arranged outside the space taken up by the legs, so that an unimpeded manual or automatic feed of the coordinate measuring machine is possible. The operator can also observe the tracing point from a short distance, as is necessary, for example, when a new measurement run is being set up. Such a setup is not possible if, as is known from the journal *Schweizer Maschinenmarkt* [*Swiss Machine Market*], No. 17, 1995, pp. 26–29, the tracing head were arranged within the space enclosed by the legs, because of reasons of accessibility and safety. Furthermore, the requirement to exert high forces, as is demanded of machine tools, would make having a boom disadvantageous, but this does not arise in the case of coordinate measuring machines, since the forces exerted during tracing are low and, furthermore, can be measured and consequently corrected.

The design according to the invention also makes it possible to separate the receptacle for the workpiece to be measured from the baseplate in a simple way, for example, by releasing a screw connection, and to make said receptacle exchangeable. A coordinate measuring machine set up at a fixed location can consequently be equipped with different workpiece receptacles. Also, a coordinate measuring machine designed to change its location frequently can be connected, for example, to fixed workpiece receptacles.

Another feature of the coordinate measuring machine according to the invention is that the legs are articulated on the baseplate and on the essentially rigid body by low-friction low-play ball joints. The ball joints comprise one of air bearings, hydraulic bearings, sliding bearings, and rolling bearings. Alternatively, the legs may include flexural elements and one of air bearings, hydraulic bearings, sliding bearings, and rolling bearings for articulation.

Additional objects, features and advantages of the invention will be set forth in the description of preferred embodiments which follows.

BRIEF DESCRIPTION OF THE DRAWINGS

Exemplary embodiments of the invention are represented in the drawings, in which:

FIG. 2 is a diagrammatic representation of the coordinate measuring machine according to the invention;

DETAILED DESCRIPTION OF PREFERRED EMBODIMENTS

Figure 1:
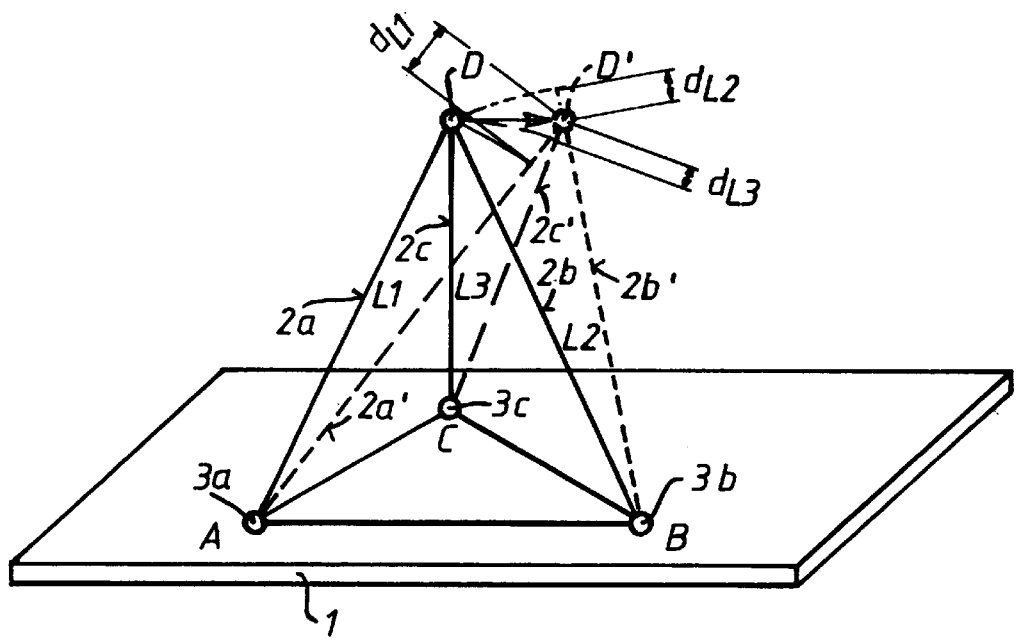
FIG. 1 is a diagrammatic representation which sets forth the mode of operation.

According to FIG. 1, there are provided on a baseplate (1) at the points (A, B, C), ball joints (3a, 3b, 3c), in which legs (2a, 2b, 2c) are mounted rotatably on all sides. The legs (2a, 2b, 2c) converge at a point (D) or in the immediate vicinity of the point (D). The legs (2a, 2b, 2c) are in each case connected to one another in an articulated manner in the region of the point (D). The legs (2a, 2b, 2c) have lengths $L_1$, $L_2$, and $L_3$.

When the point (D), which can carry the tracing head (6) of FIG. 2, is displaced towards a point (D'), the leg (2a) travels into the position (2a'), the leg (2b) into the position (2b') and the leg (2c) into the position (2c'). In order for the change in position from point (D) to point (D') to be possible, the lengths of the legs (2a, 2b, 2c) must change. The length $L_1$ of the leg (2a) changes by the amount $dL_1$, the length of the leg (2b) changes by the amount $dL_2$ and the length of the leg (2c) changes by the amount $dL_3$.

As is yet to be shown, these changes in lengths of the legs (2a, 2b, 2c) can be produced deliberately in order to displace the tracing head (6) articulated at the point (D) towards the point (D'). Such a displacement can be carried out by hand or by other means. At all events, it is necessary to record the changes in lengths of the legs (2a, 2b, 2c).

In this case, the angular changes of the legs taking place at the articulation points (A, B, C) on the baseplate (1) or at the point (D) of a body (4) (FIG. 3) during the displacement of the point (D) to the point (D') are unimportant when the length changes $dL_1$, $dL_2$, $dL_3$ are measured, since the position of each point in space is determined by three coordinates, that is to say, here, by the lengths of the legs (2a, 2b, 2c) in their initial position at the points (A, B, C) on the baseplate (1) and during the displacement of the point (D) to the point (D'). Instead of the length changes, however, angular changes of the legs relative to the baseplate can also be used for determining the change in position of the point (D) to the point (D').

Figure 3:
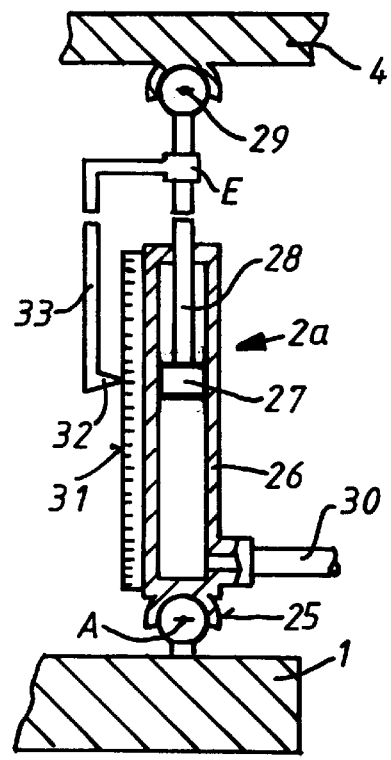
FIG. 3 is a cross section of a length-adjustable leg used in the invention.

According to FIG. 3, the legs are designed to be extendable, as shown for the leg (2a). The leg (2a) is mounted pivotably on all sides at the point (A) on the baseplate (1) by means of a ball joint (25). The leg consists of a cylindrical part (26), in which a piston (27) is mounted displaceably. The piston (27) carries a piston rod (28). The piston rod (28) is fastened by means of a ball joint (29) to the body (4) shown in FIG. 2. As shown in FIG. 1 for the point (D), the body (4) can be displaced in the three cartesian coordinate directions. The leg (2a) at the same time changes its angular inclination relative to the baseplate (1) and also to the body (4) (FIG. 1), but it also changes its length $L_1$ in relation to the center points of the balls (25, 29) of the ball joints of the points (A) and (D). The change in length of the leg (2a) and therefore the displacement of the body (4) can be controlled, for example, by means of a hydraulic medium which is forced into the cylindrical part (26) via the conduit (30). Alternatively, the displacement of the body (4) can be controlled by changing the length of the leg (2a) by pneumatic adjustment or by electromotive adjustment by means of a spindle or a linear motor.

Figure 6:
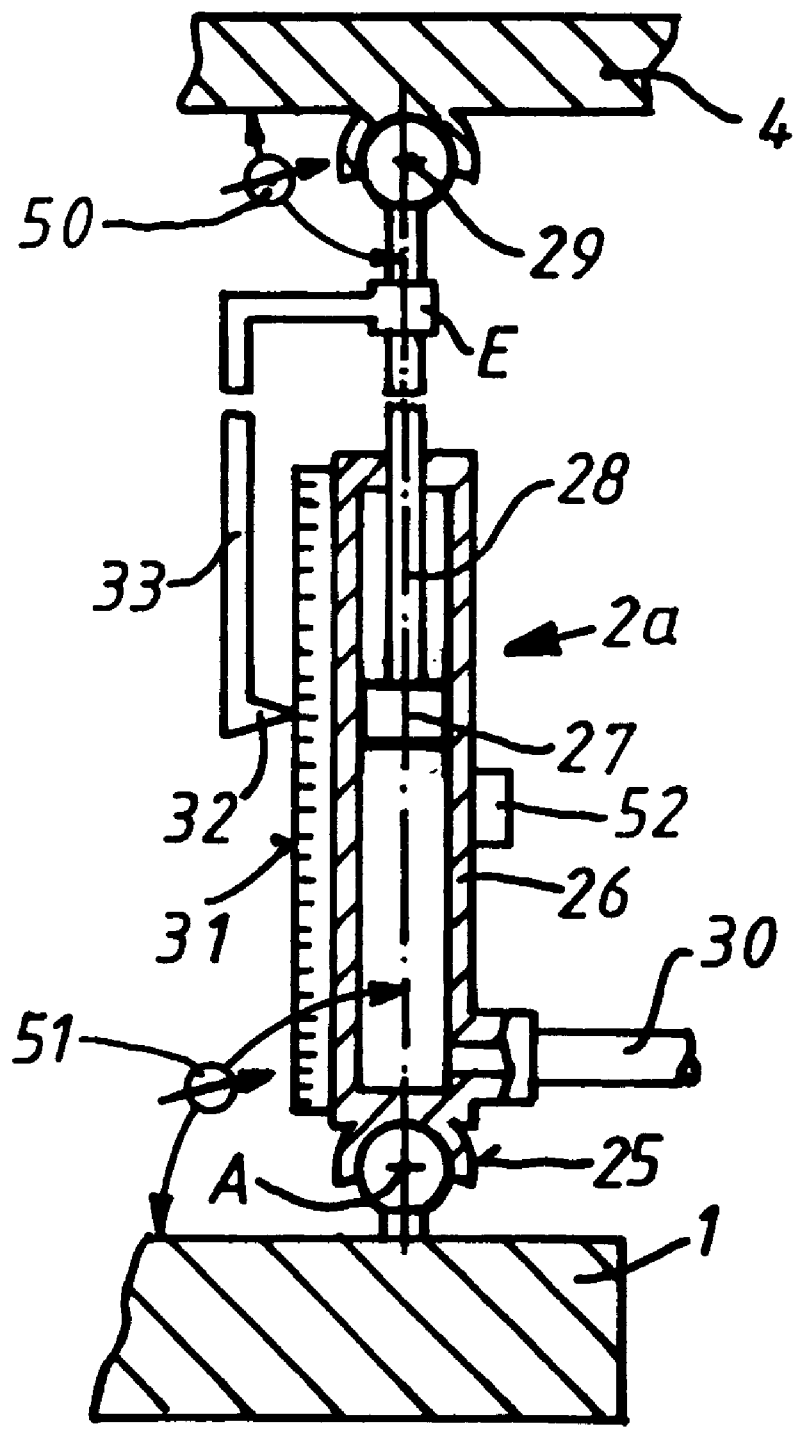
FIG. 6 illustrates a cross section of a length-adjustable leg used in the invention including angle measuring devices and a load and temperature sensor.

A mounting and control of the leg (2a), as described in FIG. 3, is provided for each of the three legs (2a, 2b, 2c) of FIG. 1. In order to record the magnitude of the change in length of the leg (2a) from a normal position, the cylindrical part (26) carries a scale (31). The change in length of the leg (2a) can be read from the scale (31) by means of a reading pointer (32) which is connected to the piston rod (28) at the point (E) via a rod (33). The amount of extension of the piston rod (28) and consequently the change in length $dL_1$ of the leg (2a) correspond to the amount of displacement of the piston (27) and therefore of the piston rod (28) of the body (4) at the articulation point of the ball joint (29). In addition to the scale (31), the leg (2a) may include load and temperature sensors (52) (see FIG. 6).

The recording of the length change $dL_1$, represented diagrammatically in FIG. 3, can be carried out by a sensor with a modern measuring device, and can be entered and stored as a value in a measuring and control device (not shown). A corresponding device is provided for each of the three legs (2a, 2b, 2c) in FIG. 1. From the measured length changes of the legs (2a, 2b, 2c), therefore, the position of the point (D) can be determined computationally or, conversely, a specific point, for example the point (D) in FIG. 1, can be traced with the aid of a control device which appropriately displace the pistons (26).

FIG. 2 shows an exemplary embodiment of the coordinate measuring machine, in which six legs (2a, 2b, 2c, 2d, 2e, 2f) are provided on the baseplate (1). Two legs are arranged in each case in the region of the points (A', B', C') on the baseplate (1) in adjacent ball joints, as shown in FIG. 3 for the leg (2a). The bearings of every two legs are close to one another, although this is not absolutely necessary. A pair of legs (2a, 2b ; 2c, 2d ; 2e, 2f) therefore extends from each point region (A', B', C'). One leg (2a) from the pair (2a, 2b) is guided to one (A") of the three corner regions of the body (4), while the other leg (2b) from the pair (2a, 2b) is guided to a different one (B") of the three corner regions of the body (4). Similarly, one leg (2c) from the pair (2c, 2d) is guided to one (B") of the three corner regions of the body (4), while the other leg (2d) from the pair (2c, 2d) is guided to a different one (C") of the three corner regions of the body (4); and one leg (2e) from the pair (2e, 2f) is guided to one (C") of the three corner regions of the body (4), while the other leg (2f) from the pair (2e, 2f) is guided to a different one (A") of the three corner regions of the body (4).

The body (4) forms a triangular framework consisting of rods (35a, 35b, 35c). The rods (35a, 35b, 35c) are fixedly connected to one another. They carry a boom (5), to which the tracing head (6) is fastened. FIG. 2 shows the boom (5) extending away from the triangular framework, but in an alternative embodiment, the boom (5) points into a space enclosed by the triangular framework and the legs.

Figure 8:
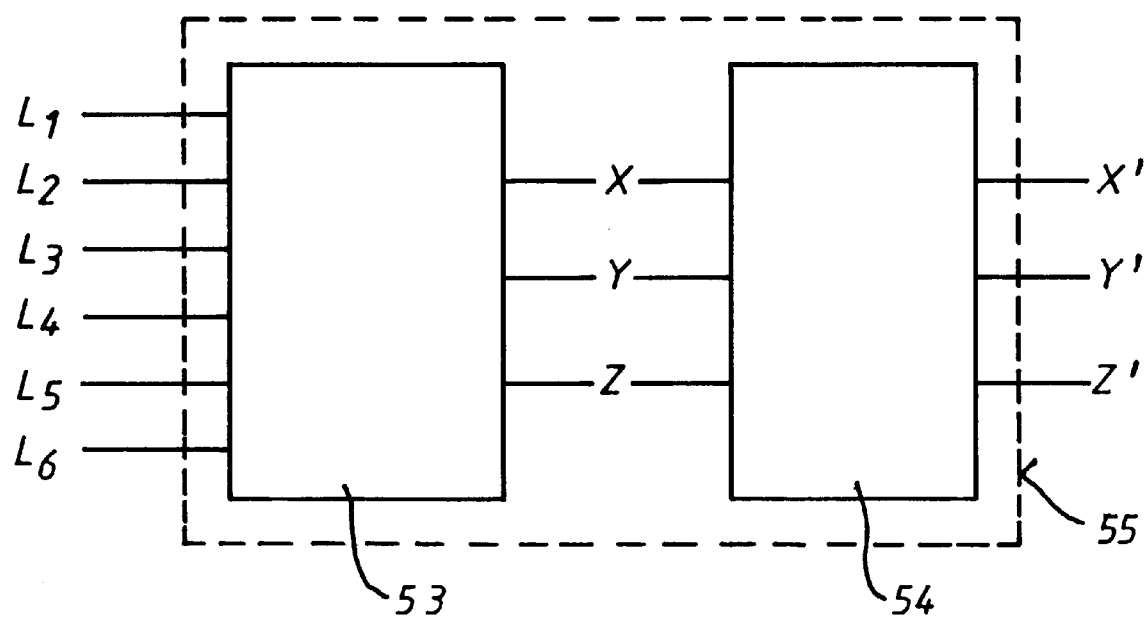
FIG. 8 illustrates a block diagram of the control device used in the invention for measuring length changes of the legs and performing a computational correction based on geometrical deviations which take place during the measuring operation.

A workpiece (8) arranged on the baseplate (1) can be traced at a measuring point by changing the lengths of the legs (2a–2f). Length changes dL of the legs (2a–2f) are recorded computationally and converted by unit (54) (see FIG. 8) into the position (X, Y, Z) of the tracing tip (6a) and are used for controlling the movement of the body (4) and of the tracing head (6). Measurements of the change in the length of the legs can be replaced by measurements of the change in the angular position of the legs. The measured changes in the angles of the legs can be performed by angle measuring devices (50, 51) (see FIG. 6) which may be arranged at articulation points on the baseplate, for recording angles of inclination of the legs relative to the baseplate, or at articulation points on the essentially rigid body, for recording angles of inclination of the legs relative to the essentially rigid body.

In this design, it is essential that the articulation points of the legs on the baseplate and on the body (4) are at, and always maintain, a constant distance from one another. In other words, the center points of the balls of the ball joints should not become displaced relative to one another. Furthermore, it is important that the lengths of the legs (2a–2f) do not change uncontrollably, because a connected computer would then detect an incorrect position of the point (D) and therefore of the tracing tip (6a). The baseplate (1) consequently consists of a thermally insensitive material and has a thickness such that warping and elongations of the baseplate (1) are ruled out.

In principle, however, it is also possible to provide a measuring and control device (55) (see FIG. 8) including sensors which constantly check the positions of the articulation points of the legs on the baseplate (1) in the region of the points (A', B', C') and convert possible deviations in position in such a way that corrections can be made to the measured values. The same applies to the legs articulated on the body (4) in the regions (A", B", C").

Also, for the purpose of assuring that the movement device for the tracer, consisting of the legs (2a–2f) and of the body (4), is not soiled and is also largely shielded against thermal influences, a housing (7) can be arranged above this movement device.

Figure 5:
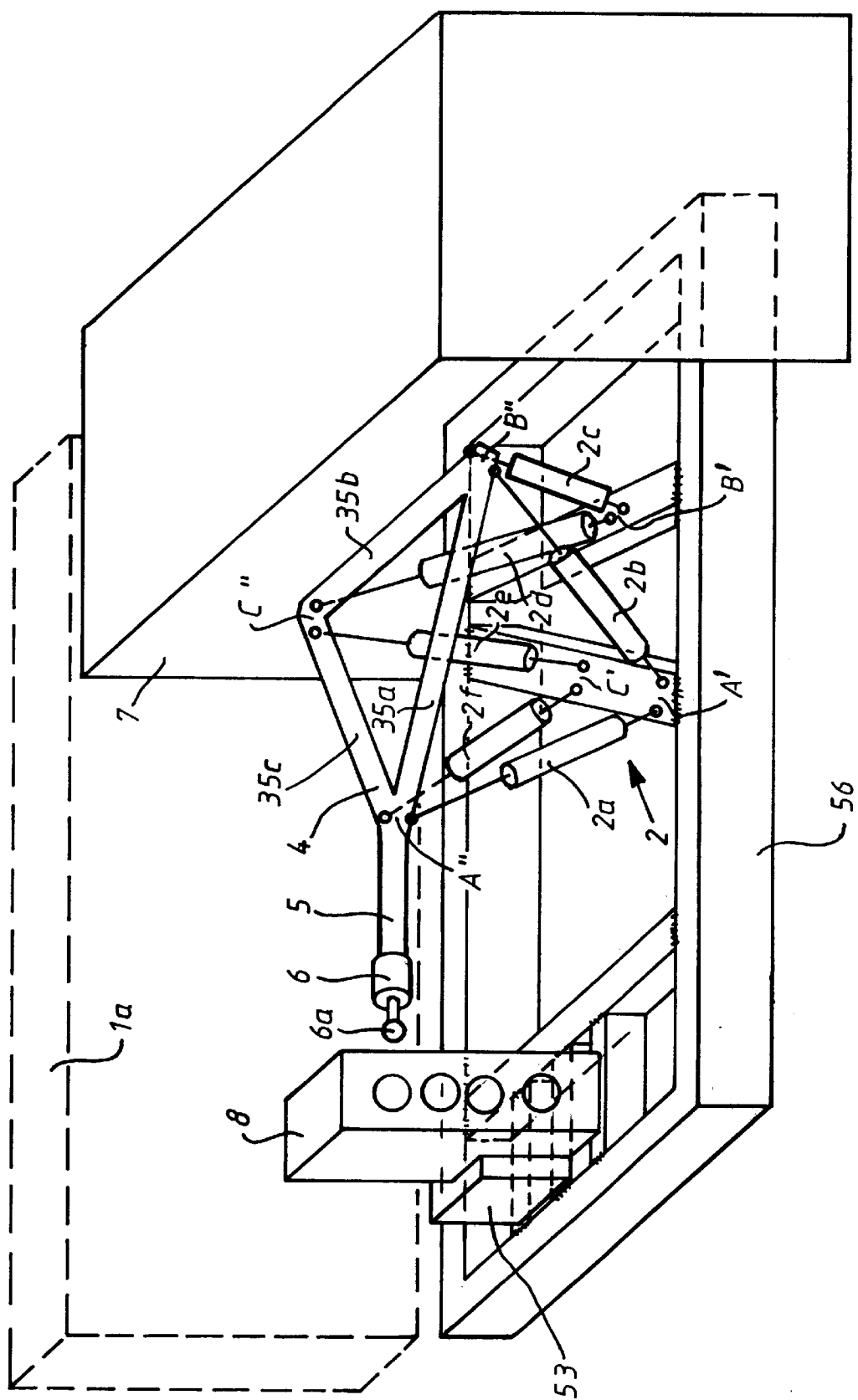
FIG. 5 illustrates a coordinate measuring machine according to the invention with a multi-part baseplate.

For transport purposes, the baseplate can be a baseplate (56) consisting of a plurality of parts which, however, then have to be assembled again (see FIG. 5) at the measuring location. Further, the baseplate (1) according to FIG. 2 is arranged on damping elements (9), for example, on hydraulic shock absorbers, so that undesirable changes in lengths of the legs (2) as a result of vibrations or the like do not occur.

The control (not shown in FIG. 2) converts the change in length of the legs into the coordinates desired by the operator and thus allows the tracing head to move along cartesian coordinate axes when a control lever is deflected. The connection to the evaluation computer is made in the same way as in conventional coordinate measuring machines.

The attainable accuracy can be increased by means of a computational correction of the geometrical deviations. A change in the lengths of the legs or of one of the legs can, however, also be replaced by the determination of the change in the angular position of at least one leg (not shown). It is also possible to provide a measuring system for recording the position of the essentially rigid body or the tracing head.

Figure 7:
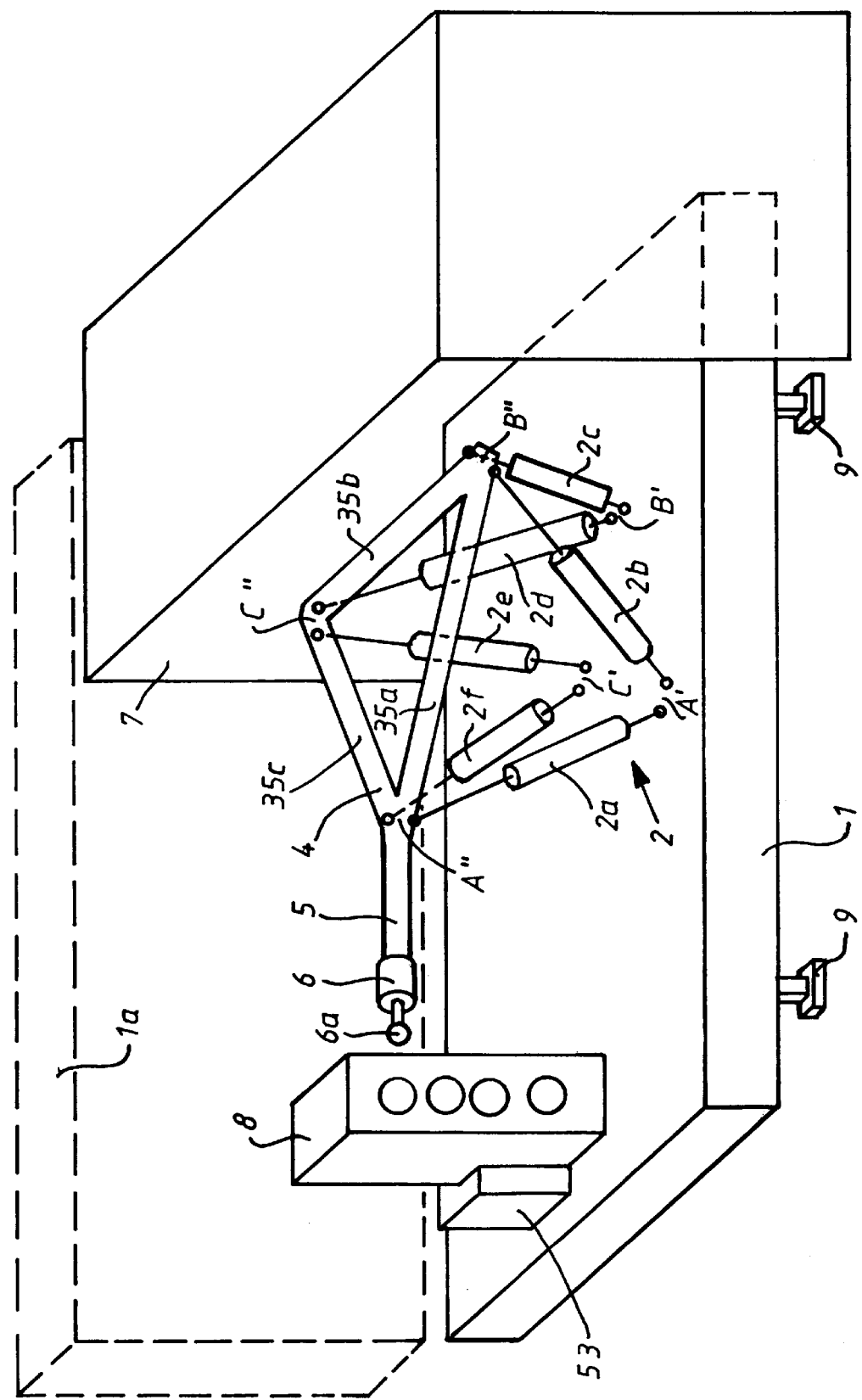
FIG. 7 illustrates a coordinate measuring machine according to the invention with a workpiece receptacle that is rigidly connected to the baseplate through a connecting element.

The coordinate measuring machine may be arranged, together with its legs (2a, 2b, 2c, 2d, 2e, 2f), on a vertically arranged baseplate (1a). The baseplate (1a) is arranged in a vertical position next to the baseplate (1) or in a spatially oblique manner. The workpiece (8) remains arranged on the baseplate (1). FIG. 7 shows the workpiece (8) connected rigidly to the baseplate (1) by a connecting element (53). The baseplate may also include a plurality of rigidly interconnected parts which are at an angle to one another, and wherein each of the interconnected parts carries at least one of the legs (see FIG. 5).

Figure 4:
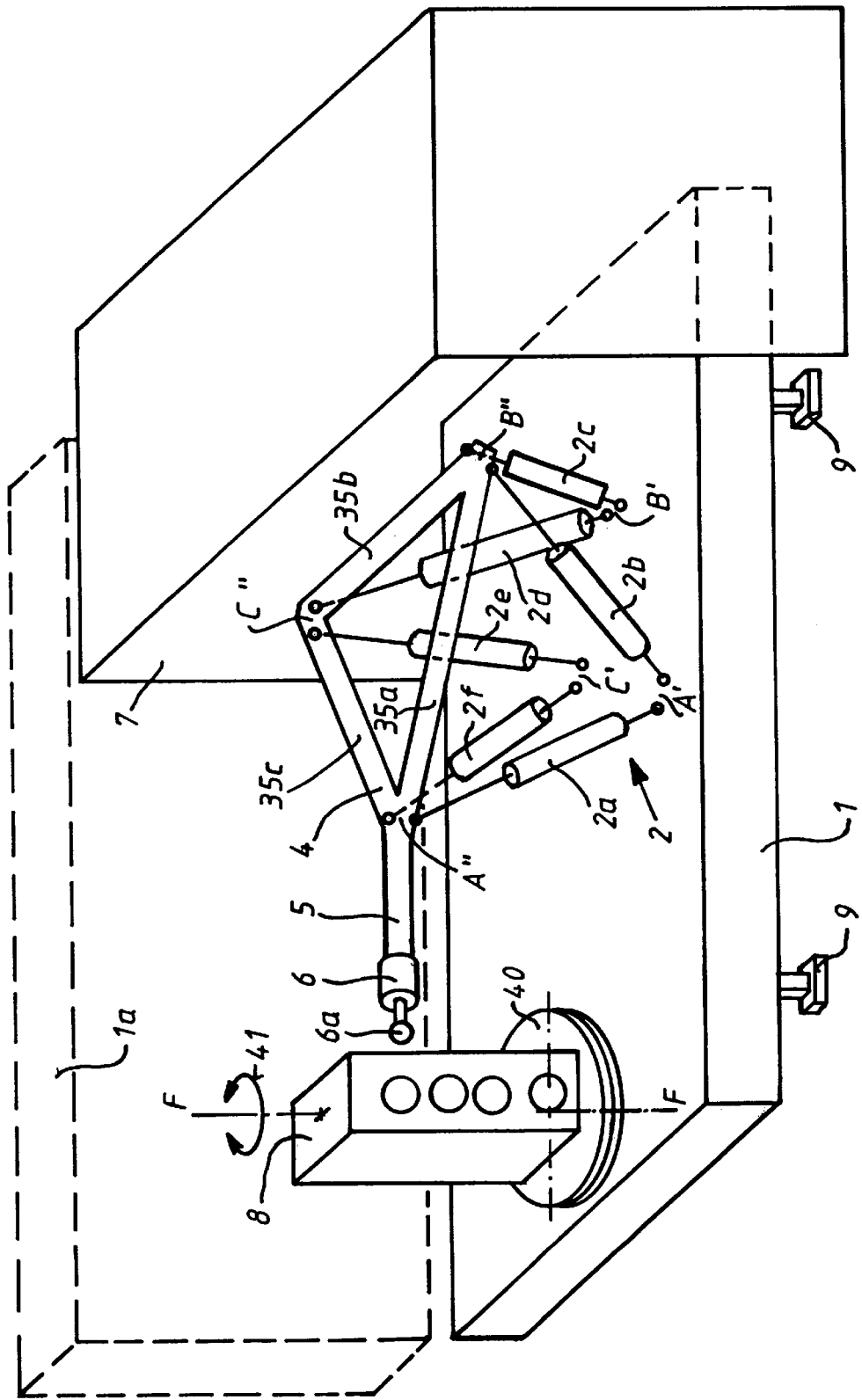
FIG. 4 illustrates a modified design of the coordinate measuring machine according to the invention.

The hexapod mounting of the tracing head is advantageous also when a turntable is employed. See FIG. 4. The turntable (40) can be provided on the baseplate (1) for the purpose of receiving the workpiece (8). Turntables of this type are used, for example, for measuring the flanks of the teeth of gearwheels. However, the turntable (40) can also advantageously serve for receiving an artifact of known dimension, e.g., a ball plate in order, by tracing this plate in various rotary positions, to check the machine-related measurement errors. According to FIG. 4, the workpiece (8) is arranged on a turntable (40) which can be rotated continuously or at predetermined angular intervals on the baseplate (1) in the direction of the arrow (41) about the axis (F—F).

While particular embodiments according to the invention have been illustrated and described above, it will be clear that the invention can take a variety of forms and embodiments within the scope of the appended claims.

We claim:

1. A coordinate measuring machine, comprising:
   a baseplate having a workpiece receptacle;
   a tracing head carried on an essentially rigid body; and
   a positioning mechanism for positioning the tracing head in relation to the workpiece receptacle, the positioning mechanism including legs which are mounted pivotably on at least three fixed points on the baseplate and pivotably on the essentially rigid body, at least three of the legs being adjustable in length.

2. The coordinate measuring machine as claimed in claim 1, wherein the essentially rigid body includes a boom on which the tracing head is mounted.

3. The coordinate measuring machine as claimed in claim 1, wherein the positioning mechanism further includes a device for measuring changes in lengths of the legs.

4. The coordinate measuring machine as claimed in claim 1, wherein the positioning mechanism has at least six legs which are mounted pivotably on the baseplate and on the essentially rigid body.

5. The coordinate measuring machine as claimed in claim 4, wherein articulation points of the legs are arranged in at least three adjacent pairs and each adjacent pair of articulation points is located near a respective one of the three fixed points on the baseplate, and wherein a center of rotation of a leg of each adjacent pair is arranged adjacent to a center of rotation of a leg of another adjacent pair on the essentially rigid body.

6. The coordinate measuring machine as claimed in claim 1, wherein the essentially rigid body has a triangular framework.

7. The coordinate measuring machine as claimed in claim 6, wherein the legs are mounted on the corners of the triangular framework.

8. The coordinate measuring machine as claimed in claim 7, wherein the triangular framework includes a boom extending away from a corner of the framework and the tracing head is mounted on the boom.

9. The coordinate measuring machine as claimed in claim 1, wherein the baseplate operates as the workpiece receptacle.

10. The coordinate measuring machine as claimed in claim 9, wherein the baseplate is of a multi-part design.

11. The coordinate measuring machine as claimed in claim 1, wherein the baseplate is arranged on damping elements.

12. The coordinate measuring machine as claimed in claim 1, wherein the baseplate is intrinsically rigid and insensitive to thermal influences.

13. The coordinate measuring machine as claimed in claim 1, wherein the legs are articulated on the baseplate and on the essentially rigid body by low-friction low-play ball joints.

14. The coordinate measuring machine as claimed in claim 13, wherein the ball joints comprise one of air bearings, hydraulic bearings, sliding bearings, and rolling bearings.

15. The coordinate measuring machine as claimed in claim 1, wherein the legs include flexural elements and one of air bearings, hydraulic bearings, sliding bearings, and rolling bearings for articulation.

16. The coordinate measuring machine as claimed in claim 1, further comprising a housing for partially enclosing the baseplate, the legs, and the essentially rigid body.

17. The coordinate measuring machine as claimed in claim 16, wherein the essentially rigid body includes a boom and the tracing head is mounted on the boom to project out from the housing.

18. The coordinate measuring machine as claimed in claim 1, wherein the legs are identical in construction.

19. The coordinate measuring machine as claimed in claim 1, wherein the legs include one of hydraulic adjustment, pneumatic adjustment, and electromotive adjustment by means of a spindle or a linear motor, for changing the lengths thereof.

20. The coordinate measuring machine as claimed in claim 1, wherein each leg of adjustable length includes a scale with which the length of the leg in relation to corresponding articulation points on the baseplate and on the essentially rigid body is traced.

21. The coordinate measuring machine as claimed in claim 1, wherein the legs include sensors which record the length of extension.

22. The coordinate measuring machine as claimed in claim 1, further comprising angle measuring devices, arranged at articulation points on the baseplate, for recording angles of inclination of the legs relative to the baseplate.

23. The coordinate measuring machine as claimed in claim 1, further comprising angle measuring devices, arranged at articulation points on the essentially rigid body, for recording angles of inclination of the legs relative to the essentially rigid body.

24. The coordinate measuring machine as claimed in claim 1, wherein the legs include load and temperature sensors.

25. The coordinate measuring machine as claimed in claim 1, wherein at least one leg has, in its initial state, a length different from that of the other legs.

26. The coordinate measuring machine as claimed in claim 1, wherein at least one of the legs has an invariable predetermined length.

27. The coordinate measuring machine as claimed in claim 1, wherein the baseplate is arranged horizontally.

28. The coordinate measuring machine as claimed in claim 27, wherein the workpiece receptacle is rigidly connected to the baseplate.

29. The coordinate measuring machine as claimed in claim 28, further comprising connecting elements to rigidly connect the workpiece receptacle to the baseplate.

30. The coordinate measuring machine as claimed in claim 1, wherein the baseplate is arranged vertically.

31. The coordinate measuring machine as claimed in claim 1, wherein the legs are arranged in pairs in such a way that, in a part of the measuring volume, their directions approximately form an orthogonal system.

32. The coordinate measuring machine as claimed in claim 1, further comprising a control device which measures length changes of the legs, and performs a computational correction based on geometrical deviations which take place during the measuring operation.

33. The coordinate measuring machine as claimed in claim 1, wherein the workpiece receptacle comprises a turntable.

34. The coordinate measuring machine as claimed in claim 33, wherein the turntable is capable of only a limited number of rotary positions, the smallest possible angular step being of the order of magnitude of a pivoting range of the essentially rigid body about a central axis of the turntable.

35. A coordinate measuring machine for measuring coordinates of a workpiece, comprising:

a baseplate on which the workpiece is received;

an essentially rigid body having a boom;

a tracing head mounted on the boom;

at least three legs mounted pivotably on the essentially rigid body and on three different regions of the baseplate, said at least three legs being length-adjustable to position the tracing head in relation to the workpiece; and a device for recording changes in lengths of said at least three legs and determining the coordinates of the workpiece based on the changes in lengths.

36. The coordinate measuring machine as claimed in claim 35, wherein six length-adjustable legs are mounted pivotably on the essentially rigid body and the baseplate.

37. The coordinate measuring machine as claimed in claim 36, wherein the six length-adjustable legs are mounted pivotably on the three different regions of the baseplate as first, second, and third adjacent pairs.

38. The coordinate measuring machine as claimed in claim 37, wherein the six length-adjustable legs are mounted pivotably on first, second, and third regions of the essentially rigid body, and wherein one leg of the first adjacent pair, one leg of the second adjacent pair, and one leg of the third adjacent pair are mounted pivotably on the first, second, and third regions of the essentially rigid body, respectively, and the other leg of the first adjacent pair, the other leg of the second adjacent pair, and the other leg of the third adjacent pair are mounted pivotably on the second, third, and first regions of the essentially rigid body, respectively.

39. The coordinate measuring machine as claimed in claim 38, wherein the essentially rigid body includes a triangular framework and said first, second, and third regions of the essentially rigid body correspond to the corners of the triangular framework.

40. The coordinate measuring machine as claimed in claim 39, wherein the tracing head is mounted at a tip of the boom.

41. A coordinate measuring machine for measuring coordinates of a workpiece, comprising:

a baseplate on which a workpiece is received;

an essentially rigid body having a boom;

a tracing head mounted on the boom;

at least six legs mounted pivotably on three different regions of the essentially rigid body and the baseplate, said at least six legs being adjustable in length to position the tracing head in relation to the workpiece; and a device for recording changes in lengths of said at least six legs and determining the coordinates of the workpiece based on the changes in lengths.

42. The coordinate measuring machine as claimed in claim 41, wherein six legs are mounted pivotably on the three different regions of the baseplate as first, second, and third adjacent pairs, wherein one leg of the first adjacent pair, one leg of the second adjacent pair, and one leg of the third adjacent pair are mounted pivotably on the first, second, and third regions of the essentially rigid body, respectively, and the other leg of the first adjacent pair, the other leg of the second adjacent pair, and the other leg of the third adjacent pair are mounted pivotably on the second, third, and first regions of the essentially rigid body, respectively.

* * * * *